United States Patent
Yamamura et al.

(10) Patent No.: US 7,403,842 B2
(45) Date of Patent: Jul. 22, 2008

(54) DRIVER ASSISTING SYSTEM

(75) Inventors: Tomohiro Yamamura, Yokohama (JP); Takayuki Kondoh, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/705,505

(22) Filed: Feb. 13, 2007

(65) Prior Publication Data
US 2007/0142978 A1    Jun. 21, 2007

Related U.S. Application Data

(62) Division of application No. 10/991,472, filed on Nov. 19, 2004, now Pat. No. 7,206,673.

(30) Foreign Application Priority Data
Nov. 20, 2003   (JP)   ............... 2003-391123

(51) Int. Cl.
*B60K 31/00* (2006.01)

(52) U.S. Cl. ............... 701/1; 701/301; 701/36; 701/96; 340/903; 340/436

(58) Field of Classification Search ............ 701/1, 701/301, 36, 96; 340/903, 436, 425.5, 435
See application file for complete search history.

(56) References Cited

U.S. PATENT DOCUMENTS

| | | | |
|---|---|---|---|
| 5,115,162 A | 5/1992 | Leonard et al. | |
| 5,521,580 A | 5/1996 | Kaneko et al. | |
| 5,695,020 A | 12/1997 | Nishimura | |
| 6,226,571 B1 * | 5/2001 | Kai | 701/1 |
| 6,542,793 B2 * | 4/2003 | Kojima et al. | 701/1 |
| 6,593,873 B2 | 7/2003 | Samukawa et al. | |
| 6,810,319 B2 | 10/2004 | Manaka | |
| 6,945,346 B2 | 9/2005 | Massen | |
| 6,980,899 B2 * | 12/2005 | Minowa et al. | 701/70 |
| 2002/0023793 A1 | 2/2002 | Hattori et al. | |
| 2002/0143449 A1 | 10/2002 | Yasuda | |
| 2003/0031333 A1 | 2/2003 | Cohen et al. | |
| 2003/0033073 A1 | 2/2003 | Kichima et al. | |
| 2003/0060936 A1 | 3/2003 | Yamamura et al. | |
| 2003/0080614 A1 | 5/2003 | Soga | |
| 2003/0149521 A1 * | 8/2003 | Minowa et al. | 701/70 |
| 2003/0163240 A1 | 8/2003 | Egami | |
| 2003/0171867 A1 | 9/2003 | Nakamori et al. | |

(Continued)

FOREIGN PATENT DOCUMENTS

DE    42 16 764 A1    11/1993

(Continued)

*Primary Examiner*—Tuan C To
(74) *Attorney, Agent, or Firm*—McDermott Will & Emery LLP

(57) ABSTRACT

A method and a system for assisting a driver operating a driver controlled input device within a vehicle, acquires data including information on environment in a field around the vehicle and information on vehicle setting regarding how devices are set within the vehicle. A risk perceived from the environment is calculated using the acquired data. Using the vehicle setting, the risk perceived is modified. Accounting for the modified risk perceived, an increment in force applied to the driver via the driver controlled input device is determined.

10 Claims, 9 Drawing Sheets

U.S. PATENT DOCUMENTS

| | | |
|---|---|---|
| 2003/0190996 A1 | 10/2003 | Yone |
| 2003/0195689 A1 | 10/2003 | Mori |
| 2003/0233902 A1 | 12/2003 | Hijikata |
| 2003/0236608 A1 | 12/2003 | Egami |
| 2004/0059490 A1 | 3/2004 | Nagura et al. |
| 2004/0104066 A1 | 6/2004 | Sakai |
| 2004/0122578 A1 | 6/2004 | Isaji et al. |
| 2005/0049761 A1 | 3/2005 | Kataoka et al. |

FOREIGN PATENT DOCUMENTS

| | | |
|---|---|---|
| JP | 5-231194 | 9/1993 |
| JP | 10-166889 | 6/1998 |
| JP | 10-166890 | 6/1998 |
| JP | 2000-054860 | 2/2000 |
| JP | 2002107245 A | 4/2002 |
| JP | 2002120585 A | 4/2002 |
| JP | 2002120991 A | 4/2002 |

* cited by examiner

FIG.7

| a | b | c | d | | PURPOSE | RP MODIFICATION | PRIORITY |
|---|---|---|---|---|---|---|---|
|   |   |   | ● | PARKING BRAKE (ON/OFF) | TO PROMPT A DRIVER TO RELEASING PKB : | PKB MODIFICATION (FIG.8) | 2 |
| ● |   | ● |   | AT SNOW MODE (ON/OFF) | TO COPE WITH A CHANGE IN RISK PERCEIVED BY A DRIVER DURING DRIVING ON SLIPPERY ROAD WITHOUT INTERFERING WITH DRIVER'S MINUTE ACCELERATOR PEDAL WORK : | SNOW MODE MODIFICATION (FIG.9) | 3 |
|   | ● | ● |   | AT POWER MODE / MANUAL MODE (ON/OFF) | TO COPE WITH A CHANGE IN RISK PERCEIVED BY A DRIVER DURING SPORTY DRIVING WITHOUT INTERFERING WITH INTENDED LARGE AND/OR RAPID ACCELERATOR PEDAL WORK : | SPORTY MODIFICATION (FIG.11) | 5 |
|   | ● | ● |   | SUSPENSION SETTING (HARD/MEDIUM/SOFT) | | | |
|   | ● |   |   | SEAT POSITION (FRONT↔REAR) | TO COPE WITH VARYING OF PERCEPTION OF REACTION FORCE WITH DIFFERENT PHYSIQUES : | PHYSIQUE MODIFICATION (FIG.12) | 1 |
|   | ● |   |   | STEERING POSITION (TILT POSITION/ TELESCOPED POSITION) | | | |
| ● |   |   |   | WIPER (INT. / Lo. / Hi) | TO COPE WITH A CHANGE IN RISK PERCEIVED DUE TO A CHANGE IN FRONT VIEW : | RAIN MODIFICATION (FIG.10) | 4 |

DRIVER ASSISTING SYSTEM

RELATED APPLICATIONS

This application is a divisional of U.S. patent application Ser. No. 10/991,472, filed Nov. 19, 2004 now U.S. Pat. No. 7,206,673, entitled DRIVING ASSISTING SYSTEM, which claims priority to Japanese Application No. 2003-391123, filed on Nov. 20, 2003, the contents of which are incorporated hereto by reference in its entireties.

FIELD OF THE INVENTION

The present invention relates to a driver assisting system, a method for assisting a driver, and a vehicle incorporating the driver assisting system.

DESCRIPTION OF RELATED ART

JP10-166889A discloses a driver assisting system, which, when a distance to a preceding vehicle drops to a predetermined value, sets an increased magnitude of reaction force of an accelerator pedal. JP10-166890A discloses a similar driver assisting system. JP2000-54860A discloses a driver assisting system, which, when an automatic control is being carried out, sets an increased magnitude of reaction force of an accelerator pedal. US 2003/0163240 A1, published Aug. 28, 2003, discloses a driving assist system, which adjusts reaction force of an accelerator pedal upon detection of a discontinuous change in environment around a vehicle.

US 2003/0060936 A1, published Mar. 27, 2003, discloses a driving assist system for assisting effort by an operator (a driver) to operate a vehicle driving traveling. This system comprises a data acquisition system acquiring data including information on vehicle state and information on environment in a field around the vehicle, a controller, and at least one actuator. The controller predicts a future environment in the field around the vehicle using the acquired data, makes an operator response plan in response to the predicted future environment, which plan prompts the operator to operate the vehicle in a desired manner for the predicted future environment, and generates a command. The actuator is coupled to an operator controlled input device to mechanically affect operation of the input device in a manner that prompts the operator in response to the command to operate the vehicle in the desired manner.

There is a need for a driver assisting system in which an appropriate magnitude of risk, which a driver should perceive, is forwarded to the driver by a force applied to a driver controlled input device within the vehicle.

SUMMARY OF THE INVENTION

These and other needs are met by the present invention which provides a driver assisting system for a vehicle having a driver controlled input device operable by a driver and through which force may be applied to the driver. Information on environment in a field around the vehicle and information on vehicle setting regarding how devices are set within the vehicle are acquired. The system calculates risk from the environment using the acquired data and the vehicle setting. Accounting for the calculated risk, a change in a force applied to the driver via the driver controlled input device is determined. A force modification is then determined and used to modify the change in force at the driver controlled input device according to the determined force modification.

The foregoing and other features, aspects and advantages of the present invention will become apparent from the following detailed description of the present invention when taken in conjunction with the accompanying drawings.

BRIEF DESCRIPTION OF THE DRAWINGS

FIG. 7 is a table illustrating various modifications of a risk perceived (RP);

DETAILED DESCRIPTION OF THE INVENTION

For better understanding of the background of the present invention, reference should be made to the previously mentioned US 2003/0060936 A1, published Mar. 27, 2003, which has been hereby incorporated by reference in its entirety.

Figure 1:
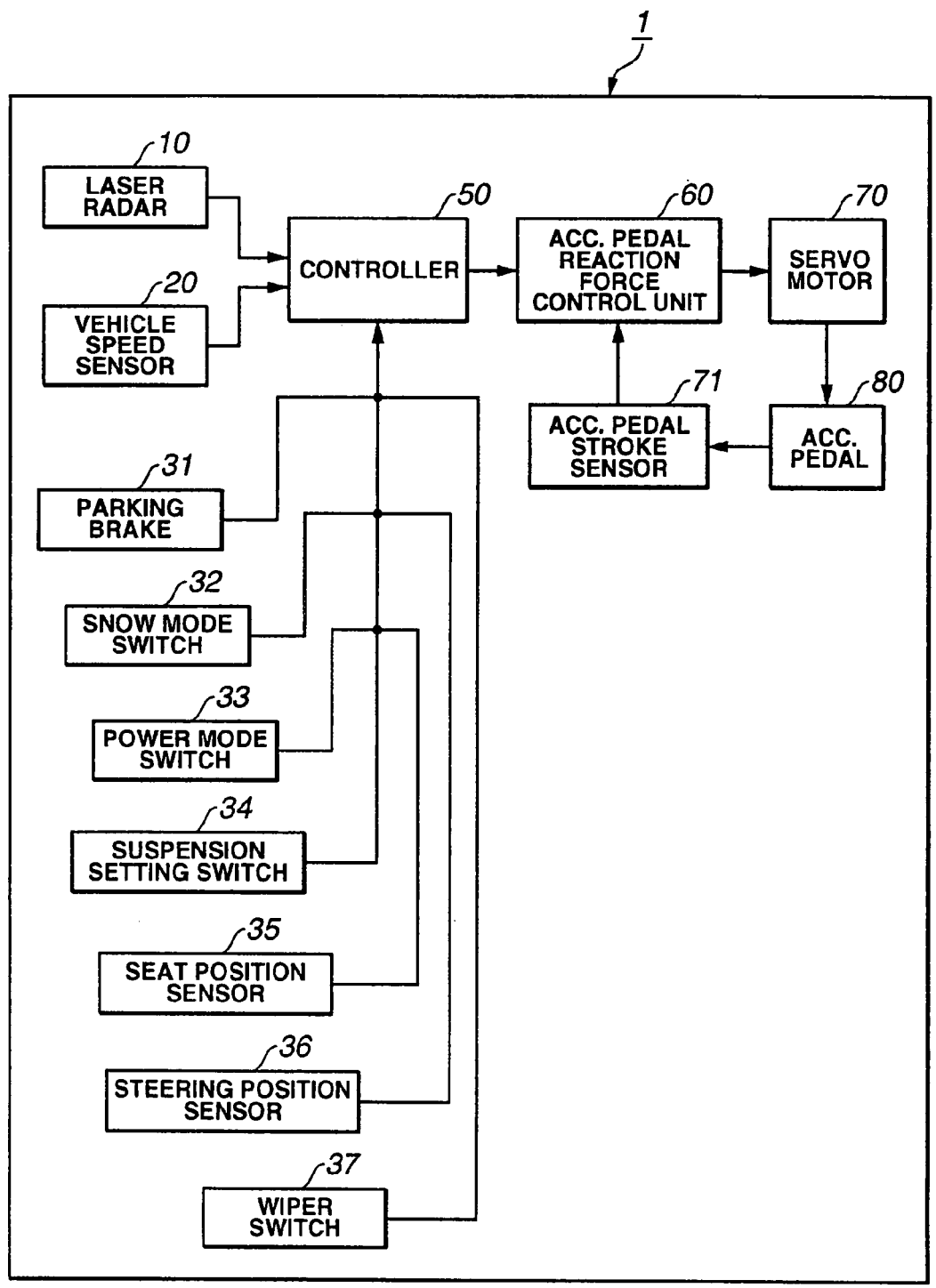
FIG. 1 is a block diagram illustrating hardware of one exemplary implementation of a driver assisting system according to the present invention.
Figure 2:
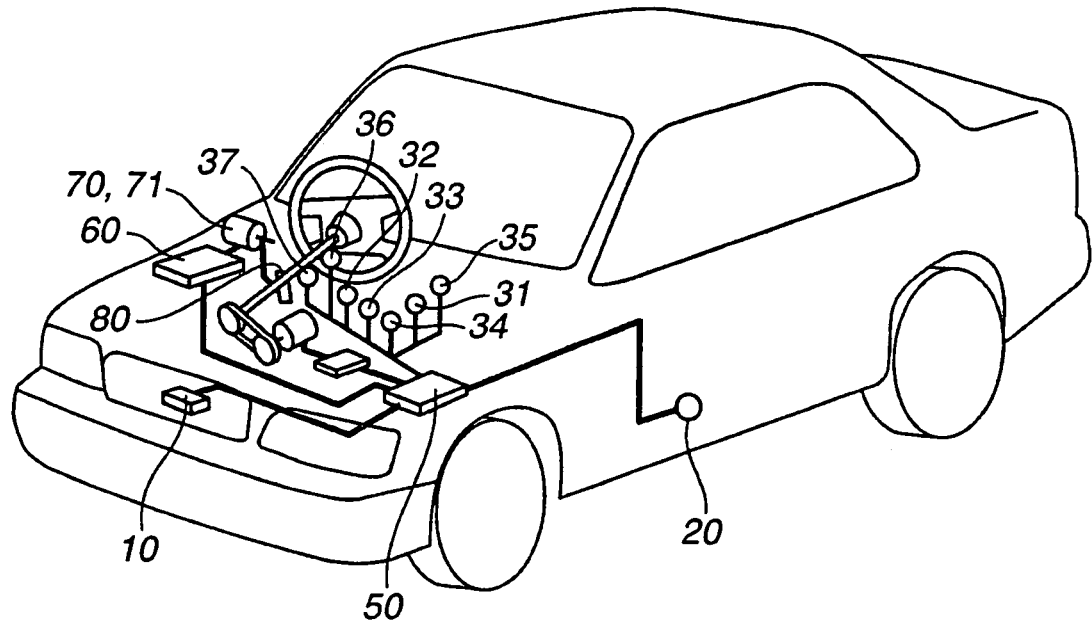
FIG. 2 is a perspective view of a vehicle in the form of an automobile incorporating the driver assisting system.

FIG. 1 is a block diagram showing elements constituting one exemplary implementation of a driver assisting system 1 according to the present invention. FIG. 2 is a perspective view of an automobile installed with the driver assisting system 1.

Figure 5:
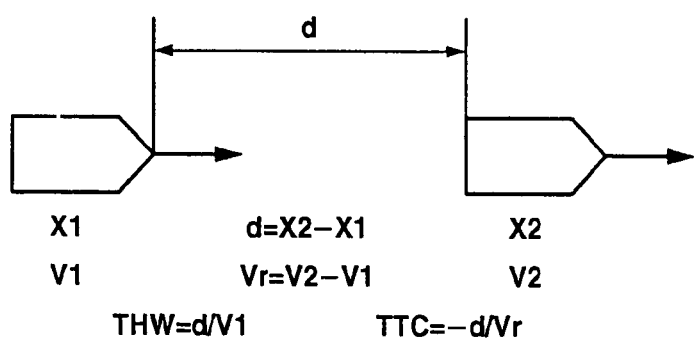
FIG. 5 is a traffic scene illustrating a preceding vehicle running in front.

The driver assisting system 1 includes a laser radar 10, in exemplary embodiments. As shown in FIG. 2, the laser radar 10 is mounted to the vehicle at a front bumper or a front grille thereof. It scans horizontally and laterally about 6 degrees to each side of an axis parallel to the vehicle longitudinal centerline, propagates infrared pulses forwardly and receives the reflected radiation by an obstacle, such as a rear bumper of a preceding vehicle. Referring also to FIG. 5, the laser radar 10 can provide a distance d to a preceding vehicle in front and a relative speed Vr to the preceding vehicle. The laser radar 10 provides, as outputs, the detected distance d and relative speed Vr to a controller 50. In the traffic scene illustrated in FIG. 5, the vehicle shown in FIG. 2 is located at X1 and traveling at a vehicle speed V1, and the preceding vehicle is located at X2 and traveling at a vehicle speed V2.

The driver assisting system 1 also includes a vehicle speed sensor 20. The vehicle speed sensor 20 may determine the vehicle speed V1 by processing outputs from wheel speed sensors. The vehicle speed sensor 20 may include an engine controller or a transmission controller, which can provide a signal indicative of the vehicle speed. The vehicle speed sensor 20 provides, as an output, the vehicle speed V1 to the controller 50.

The driver assisting system 1 further includes a parking brake (PKB) switch 31, a snow mode switch 32, a power mode switch 33, a suspension setting switch 34, a seat position sensor 35, a steering position sensor 36, and a wiper switch 37. These switches and sensors provide signals, as outputs, to the controller 50.

The parking brake switch 31 provides, as an output, a two-level PKB signal having an "ON" level and an "OFF" level. The PKB signal takes the "ON" level when a parking brake is applied or activated. When the parking brake is released, the PKB signal takes the "OFF" level. The snow mode switch 32 and power mode switch 33, which are mounted to the vehicle illustrated in FIG. 2 near a steering wheel 90, are used to provide a mode setting of an automatic transmission (A/T). The automatic transmission is operable to effect speed ratio change in a shift pattern fit for running on a slippery road when the snow mode switch 32 is set to an "ON" level to select a snow mode. The automatic transmission is operable to effect speed ratio change in a shift pattern fit for acceleration when the power mode switch 33 is set to an "ON" level to select a power mode.

The suspension setting switch 34, which is mounted to the vehicle illustrated in FIG. 2 near a center console box, is used to select any one of three different performance settings, which a variable suspension of the vehicle may take. Manipulating the suspension setting switch 34, the driver may select any one of three different performance settings, namely "Hard", "Medium", and "Soft" because the variable suspension may shift in performance setting only by altering spring constant and damping characteristic of shock absorbers.

The seat position sensor 35 detects a longitudinal position, which a driver's seat assumes. The steering position sensor 36 detects a position, which the steering wheel 90 assumes. The position of the steering wheel 90 includes a tilt position, which the steering wheel 90 is tilted to, and a telescoped position, which the steering wheel 90 is retracted to. The wiper switch 37 is used to indicate which one of three setting states, namely, "Interrupt", "Low" and "High", a wiper is operable in.

The various sensors and detectors described above are exemplary only, as other embodiments of the invention use different types and combinations of sensors and detectors to detect the same or different environment conditions and different settings.

The controller 50 responsible for information processing within the driver assisting system 1 may contain a microprocessor including a central processing unit (CPU), a read only memory (ROM), and a random access memory (RAM). The controller 50 calculates a risk perceived (RP) by the driver from the surrounding environment using acquired data from output signals of the vehicle speed sensor 20 and laser radar 10. The acquired data include vehicle speed V1, distance d, and relative speed Vr. In certain embodiments, the controller 50 modifies the risk perceived (RP) based on vehicle setting data regarding how devices are set within the vehicle given by the switches and sensors 31~37. The controller 50 uses the modified risk perceived ($RP_{out}$) in certain embodiments instead of the unmodified risk perceived (RP) in calculating a predetermined function to give an instruction value indicative of an increment dF in reaction force. The controller 50 provides, as an output, a value indicative of the change, or increment dF (positive or negative), to an accelerator pedal reaction force control unit 60.

Hence, the controller 50 can be considered to include a control section that calculates risk from the environment and a control section that, accounting for the risk, determines a change in force applied to the driver via a driver controlled input device, such as an accelerator pedal. The controller 50 can also be considered to include a modification section that determines a force modification, and which modifies the change in force produced by the control section and felt by the driver at the accelerator pedal or other operator controlled input device. This is achieved in certain embodiments by modifying the risk, as described above. In certain other embodiments, the modification of the change in force felt by the driver is achieved not by modifying the calculated risk, but by acting on the driver controlled input device more directly, such as by controlling a force application device that acts on the driver controlled input device.

Figure 3:
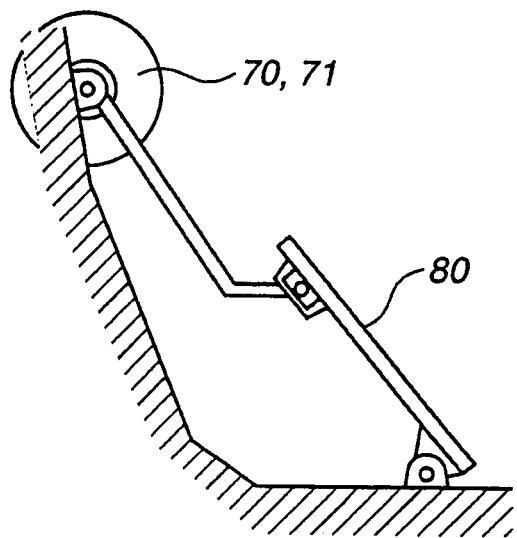
FIG. 3 is a driver controlled device, in the form of an accelerator pedal, of the vehicle.

In response to the value dF, the accelerator pedal reaction force control unit 60 regulates a servo motor 70 of an accelerator pedal 80. As shown in FIG. 3, the accelerator pedal 80 has a link mechanism including a servo motor 81 and an accelerator pedal stroke sensor 71. The servo motor 70 may provide a desired torque and a desired angular position in response to the value dF from the accelerator pedal reaction force control unit 60. The accelerator pedal stroke sensor 71 detects an accelerator pedal stroke or position S of the accelerator pedal 80 by measuring an angle of the servo motor 70. The angle of the servo motor 70 corresponds to the accelerator pedal stroke S because the servo motor 70 and the accelerator pedal 80 are interconnected by the link mechanism.

For better understanding of the accelerator pedal of the above kind, reference should be made to US 2003/0236608 A1 (published Dec. 25, 2003) and also to US 2003/0233902 A1 (published Dec. 25, 2003), both of which have been hereby incorporated by reference in their entireties.

Figure 14:
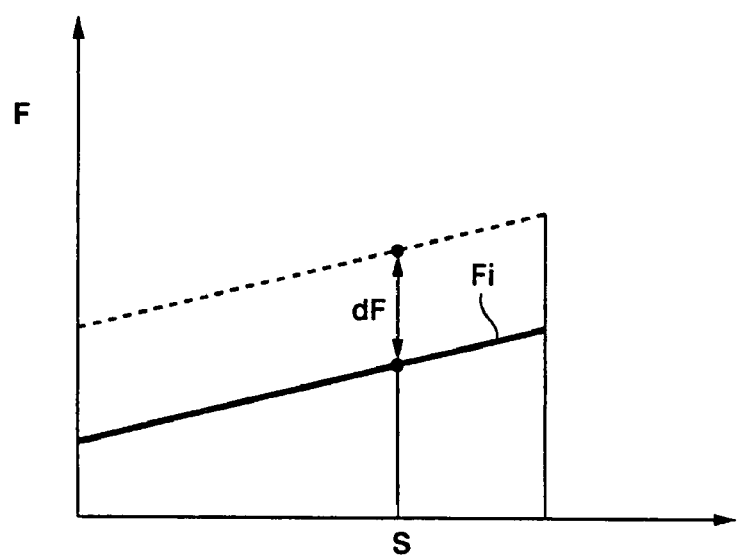
FIG. 14 illustrates varying of reaction force (F) with different values of accelerator pedal stroke (S)

Referring to FIG. 14, the fully drawn line illustrates an ordinary reaction force varying characteristic Fi provided by the accelerator pedal 80 when the accelerator pedal reaction force control unit 60 does not carry out the above-mentioned control to produce an increment as large as that dF indicated by the value. This ordinary reaction force characteristic Fi indicates linearity of the reaction force Fi, which is accomplished by a spring force provided by a torque spring arranged at the center of rotational movement of the accelerator pedal 80.

The following is a description of the operation of the above description exemplary implementation of driver assisting system 1.

The controller 50 calculates a risk perceived (RP) based on the acquired data regarding an obstacle or obstacles in the environment around the vehicle. The controller 50 provides a control value to the accelerator pedal reaction force control unit 60. The accelerator pedal reaction force control unit 60 regulates the servo motor 70, causing it to provide a reaction force F to the driver via the accelerator pedal 80. With the same reaction force F, the driver might perceive varying magnitudes of risk with different states or conditions the driver is involved in. Therefore, a need remains for varying the magnitude of reaction force F so that, with different states the driver is involved in, the driver may perceive the same magnitude of risk.

Defining a single magnitude of an increment (dF) in reaction force for one magnitude of the calculated risk perceived (RP) cannot adequately forward the magnitude of the calculated risk to the driver for the following reasons:

(a) A driver may feel the same reaction force from an accelerator pedal in ways varying with different states of a vehicle;

(b) A driver may feel the same reaction force from an accelerator pedal in ways varying with different states of the driver;

(c) As a certain state of a driver or a vehicle arises, providing a reaction force corresponding to a risk perceived (RP) to the driver via an accelerator pedal may discourage the driver from conducting a fine manipulation of the accelerator pedal;

(d) A state of a vehicle may arise in which the vehicle state should be forwarded to the driver before forwarding a risk perceived (RP) to the driver.

The above-mentioned situations (a), (b), (c) and (d) are listed in table illustrated in FIG. 7 under the characters "a", "b", "c", and "d", respectively.

Figure 4:
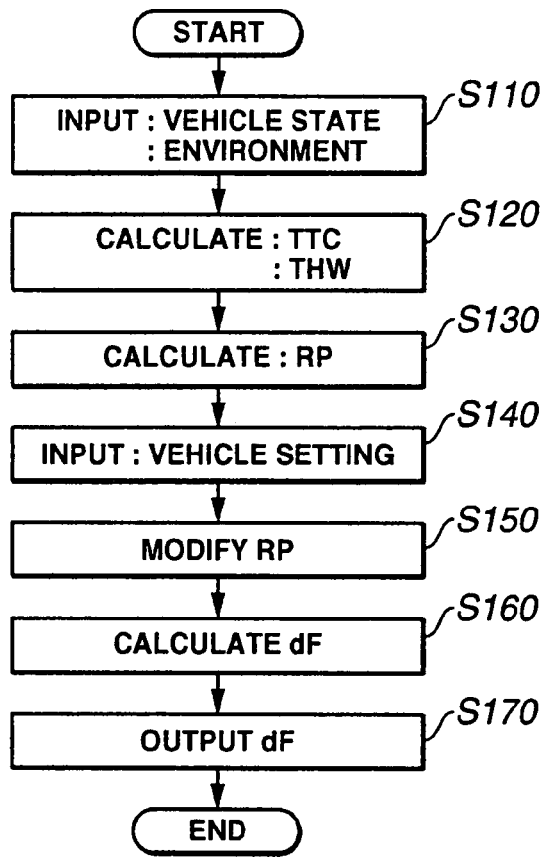
FIG. 4 is a flow chart of a main routine.

In certain exemplary implementation, the driver assisting system 1 detects or acquires vehicle setting data regarding how devices are set within the vehicle, modifies the risk perceived (RP) using the vehicle setting data, and uses the modified risk perceived ($RP_{out}$) instead of the unmodified risk perceived (RP) in calculating a predetermined function to provide a value (dF) indicative of the change in reaction force. This control is more specifically described along with the flowchart in FIG. 4. The flow chart in FIG. 4 illustrates a main routine of a driver assisting control program stored, for example, in the controller 50. The execution of the main routine is repeated at regular intervals of, for example, 50 msec.

In FIG. 4, at step S119, the controller 50 receives, as inputs, signals of the laser radar 10 and vehicle speed sensor 20 by reading operations to acquire data regarding the vehicle state and the environment state in a field around the vehicle. Taking the traffic scene illustrated in FIG. 5, for example, the acquired data include a vehicle speed V1, a vehicle speed V2 of the preceding vehicle, and a relative speed to the preceding vehicle Vr. The relative speed Vr may be expressed as Vr=V2−V1. The acquired data include a coordinate X1 of the vehicle and a coordinate X2 of the preceding vehicle, and a distance d to the preceding vehicle. The distance d may be expressed as d=X2−X1.

At step S120, the controller 50 calculates a time to collision TTC and a time headway THW, which will be used as two concepts to constitute a risk perceived RP by the driver from the preceding vehicle.

The TTC is a measure of time from a current moment to a future moment when the distance d would become zero if the relative speed Vr to the preceding vehicle remains unaltered. The TTC may be expressed as:

$$TTC=-d/Vr \qquad (Eq. 1)$$

The smaller the value of TTC, the more imminent is the collision and the larger is the value of an extent the vehicle has approached the preceding vehicle. In a traffic scene where a vehicle is following the preceding vehicle, most vehicle drivers perceive a high degree of risk and initiate deceleration to avoid collision well before the TTC becomes less than 4 seconds. To some extent, the TTC is a good indication for predicting a future behavior the vehicle driver might take. However, when it comes to quantifying the degree of risk, which the vehicle driver actually perceives, there is a discrepancy between the TTC and the degree of risk. Thus, the TTC alone is insufficient to quantify the degree of risk.

Such discrepancy may be confirmed by considering a traffic scene where the relative speed Vr is zero. In this case, the TTC is infinite irrespective of how narrow the distance d is. However, the driver perceives an increase in the degree of risk in response to a reduction in the distance d, accounting for an increase in how much an unpredictable drop in a vehicle speed of the preceding vehicle might influence the TTC.

To remedy the above-mentioned discrepancy, the concept of time headway THW has been introduced to quantify an increase in how much an unpredictable drop in the vehicle speed of the preceding vehicle might influence the TTC in a traffic situation where the vehicle is following the preceding vehicle with the distance d kept constant. The THW is a measure of a timer that is set to count when the preceding vehicle reaches a point on a road and will be reset subsequently when the following vehicle will reach the same point. The THW is expressed as, $$THW=d/V1 \qquad (Eq. 2)$$

In the case where the vehicle is following the preceding vehicle, the vehicle speed V2 of the preceding vehicle may be used instead of the vehicle speed V1 in the above-mentioned equation 2.

The relationship between the two notions TTC and THW is such that a change in vehicle speed V2, if any, of the preceding vehicle results in a small change in the TTC when the THW is long, but the same change in vehicle speed V2 of the preceding vehicle results in a large change in the TTC when the THW is short.

At step S130, the controller 50 calculates the risk perceived RP. In this exemplary implementation, the risk perceived RP is expressed as a sum of a first extent and a second extent. The first extent represents to what degree the vehicle has approached the preceding vehicle. The second extent represents to what degree an unpredictable change in vehicle speed V2 of the preceding vehicle might have influence upon the vehicle. The first extent may be expressed as a function of the reciprocal of time to collision TTC, and the second extent may be expressed as a function of the reciprocal of time headway THW.

In the first exemplary implementation, the risk perceived RP may be expressed as, $$RP=a/THW+b/TC \qquad (Eq. 3)$$

where: b and a (b>a) are parameters weighting 1/TTC and 1/THW, respectively, such that 1/THW is less weighted than 1/TTC. The values of b and a are optimized after accounting for statistics of values of THW and TTC collected in a traffic situation including one vehicle following another vehicle. In this exemplary implementation, b=8 and a=1.

At the next step S140, the controller 50 receives, as inputs, output signals of the parking brake 31, snow mode switch 32, power mode switch 33, suspension setting switch 34, seat position sensor 35, steering position sensor 36, and wiper switch 37 by performing reading operations to acquire vehicle setting data regarding how devices are set within the vehicle.

Figure 6:
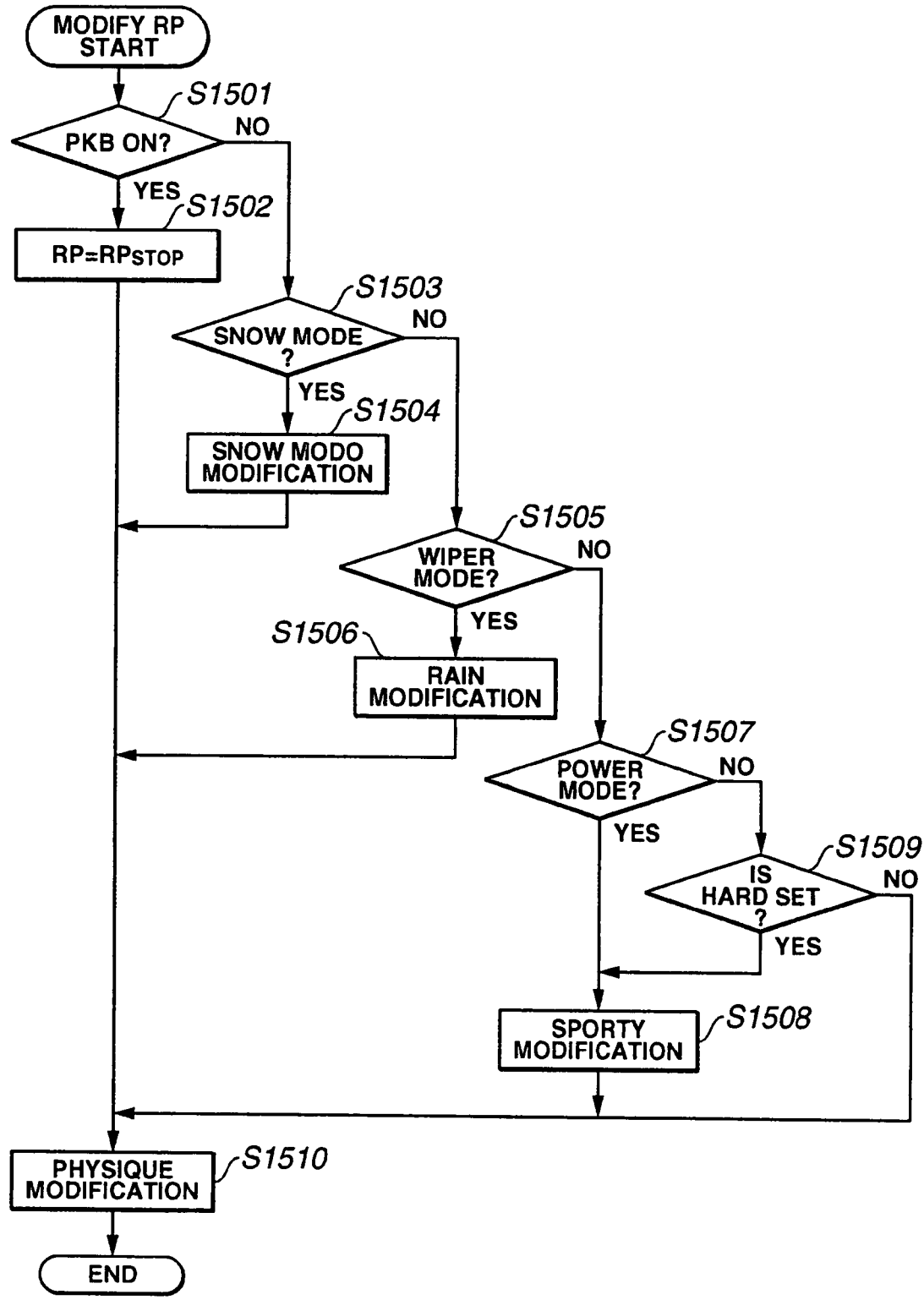
FIG. 6 is a flow chart of a subroutine.

At step S150, the controller 50 modifies the risk perceived RP determined at step S130 with the vehicle setting data determined at step S140. In this exemplary implementation, at step S150, the controller 50 executes the subroutine illustrated in FIG. 6. Referring to FIG. 6 and FIG. 7, processes to modify the risk perceived RP with the vehicle setting data are described. The table in FIG. 7 lists various modifications of the risk perceived RP with different vehicle speed settings. The various modifications are given priorities 1, 2, 3, 4, and 5. In the order indicated by the priorities, the controller 50 performs the modifications of the risk perceived RP. Under the characters "a", "b", "c", and "d" in FIG. 7, the previously mentioned situations (a), (b), (c) and (d) are listed, respectively.

In FIG. 6, at step S1501, the controller 50 determines whether or not the parking brake (PKB) is set "ON" (or applied). The controller 50 receives, as an input, the output signal of the parking brake 31 by performing a reading operation to acquire, as one of the vehicle setting data, whether the parking brake 31 is set "ON" (applied) or "OFF" (released). If, at step S1501, the parking brake 31 is set "ON", the logic proceeds to step S1502. The state or setting position that the parking brake 31 is "ON" is considered to be one vehicle setting to be forwarded to the driver before forwarding the risk perceived RP to the driver. Thus, at step S1502, the controller 50 modifies the risk perceived RP in response to the state or setting position of the parking brake 31. This modification is called a "PKB modification". The controller 50 performs the PKB modification to modify the risk perceived RP to forward an alert to the driver with the parking brake 31 being left applied, prompting the driver to release the parking brake 31 immediately.

Figure 8:
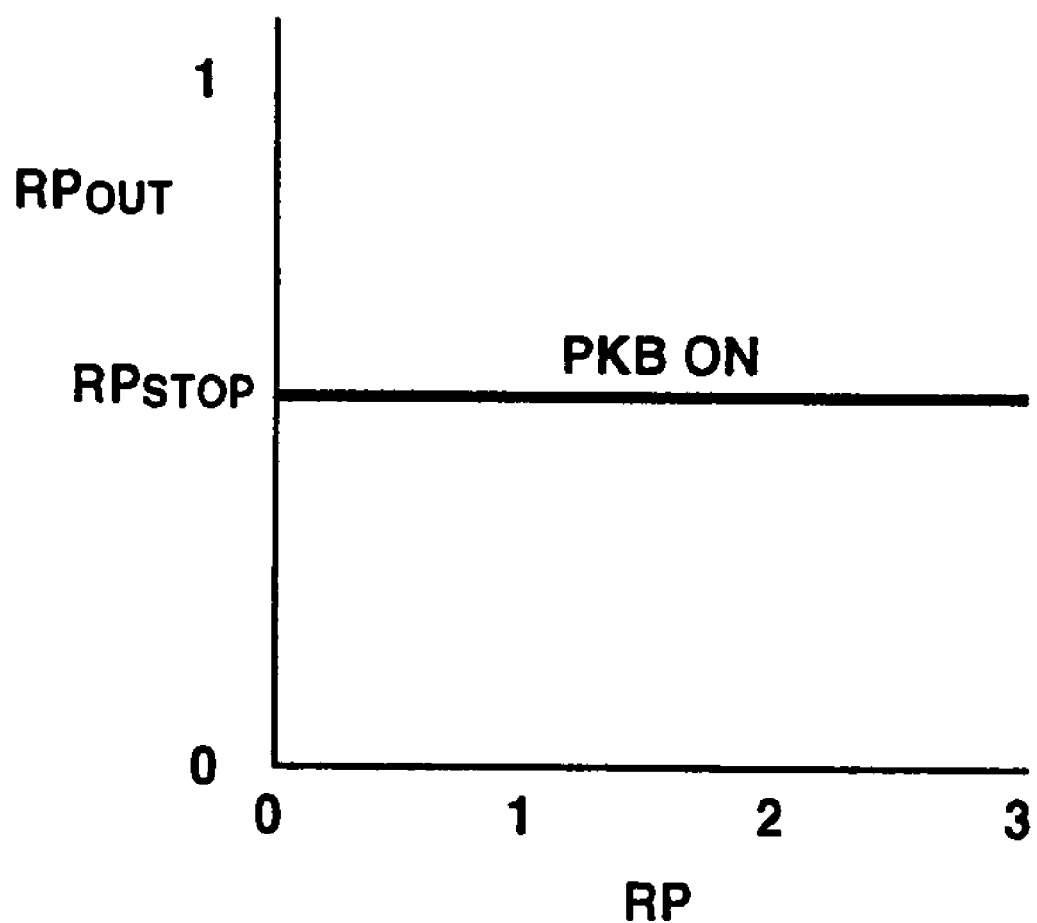
FIG. 8 illustrates a map used for a parking brake (PKB) modification of a risk perceived (RP)

One example of the PKB modification is illustrated in FIG. 8. In FIG. 8, the horizontal axis represents the calculated or unmodified risk perceived RP. The vertical axis represents a modified risk perceived $RP_{out}$. When the parking brake 31 is "ON", the controller 50 relies on the relationship or map illustrated in FIG. 8 using the calculated or unmodified risk perceived RP to give, as the modified risk perceived $RP_{out}$, a predetermined value of $RP_{out}$.

When the parking brake 31 is "ON" or applied, the controller 50 sets the predetermined value $RP_{stop}$ as the modified risk potential $RP_{out}$ and uses this predetermined value instead of the calculated or unmodified risk potential RP. With the PKB modification, the reaction force regulation is carried out based on the predetermined value $RP_{stop}$ to provide an increment (positive or negative) in reaction force to the driver via the accelerator pedal 80, thus forwarding an alert to the driver when the driver steps on the accelerator pedal 80 to move the vehicle from standstill with the parking brake 31 left applied. After the PKB modification at step S1502, the logic goes to step S1510.

If, at step S1501, the parking brake is "OFF" or released, the logic proceeds to step S1503. At step S1503, the controller 50 determines whether or not the snow mode switch 32 is set "ON" and therefore the automatic transmission is in the snow mode. The controller 50 receives, as an input, the output signal of the snow mode switch 32 by performing a reading operation to acquire, as one of the vehicle setting data, whether the snow mode switch 32 is set "ON" or "OFF". If, at step S1503, the snow mode switch 32 is set "ON" to select the snow mode, the logic goes to step S1504. The state or setting position that the snow mode switch 32 is "ON" is considered to be one vehicle setting to be forwarded to the driver before forwarding the risk perceived RP to the driver. As the vehicle is running on a slippery road in the state when the snow mode is selected, the driver may feel a reaction force from the accelerator pedal 80 in a different way. Thus, at step S1504, the controller 50 modifies the risk perceived RP in response to the state or setting position of the snow mode switch 32. If, under this condition, a reaction force regulated in response to the regulated or unmodified risk perceived RP is provided to the driver, the driver may be refrained from performing a fine manipulation of the accelerator pedal 80.

Figure 9:
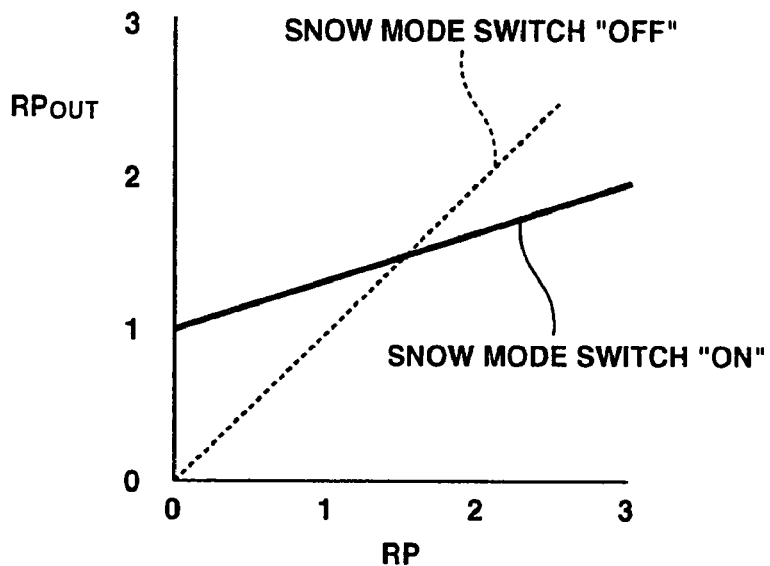
FIG. 9 illustrates a map used for a snow mode modification of the risk perceived (RP)

At step S1504, the controller 50 modifies the risk perceived RP in response to the state or setting position that the snow mode is selected. This modification is called a "snow mode modification". One example of the snow mode modification is illustrated in FIG. 9. In FIG. 9, the horizontal axis represents the calculated or unmodified risk perceived RP. The vertical axis represents a modified risk perceived $RP_{out}$. When the snow mode switch 32 is "ON" to set the snow mode, the controller 50 relies on the relationship or map illustrated by the fully drawn line in FIG. 9 using the calculated or unmodified risk perceived RP. In FIG. 9, the dotted line illustrates the relationship by which the calculated risk received RP is unmodified and used as the modified $RP_{out}$. Comparing the fully drawn line to the dotted line clearly indicates that a change in the modified risk perceived $RP_{out}$ to a change in the calculated or unmodified risk perceived RP is less when the snow mode is selected. According to the fully drawn line in FIG. 9, the minimum value of the modified risk perceived $RP_{out}$ is greater than that of the calculated or unmodified risk perceived RP, and the maximum value of the modified risk perceived $RP_{out}$ is less than that of the calculated or unmodified risk perceived RP.

The setting is such that the modified risk perceived $RP_{out}$ is higher than the calculated or unmodified risk perceived RP over lower region of the calculated or unmodified risk perceived RP and a change in the modified risk perceived $RP_{out}$ is smaller than that in the calculated or unmodified risk perceived RP. This setting provides a reaction force to the driver via the accelerator pedal 80, which is low enough to permit the driver to perform a fine manipulation of the accelerator pedal 80, but high to approximate the tendency of the driver feeling risk higher during driving on slippery road. After the snow mode modification at step S1504, the logic goes to step S1510.

If, at step S1503, the snow mode switch 32 is "OFF", the logic goes to step S1505. At step S1505, the controller 50 determines whether or not the wiper switch 37 is "ON" and so the wiper is in operation. The controller 50 receives, as an input, the output signal of the wiper switch 37 by performing a reading operation to acquire, as one of the vehicle setting data, whether the wiper switch 37 is set "ON" or "OFF". If, at step S1505, the wiper switch 37 is set "ON", the logic proceeds to step S1506. The state or setting position that the wiper switch 37 is set "ON" is considered to be one vehicle setting to be forwarded to the driver before forwarding the risk perceived RP to the driver. As the vehicle is running on road under rainy or snowy weather in the state when the wiper is in operation, the driver may feel a reaction force from the accelerator pedal 80 in a different way. Thus, at step S1506, the controller 50 modifies the risk perceived RP in response to which one of selectable modes the wiper is operating in. This modification is called a "rain or rainy weather modification". Specifically, the calculated or unmodified risk perceived RP is modified in response to a change in driver's perception caused by poor visibility due to rain or snow or due to rainfall or snowfall.

Figure 10:
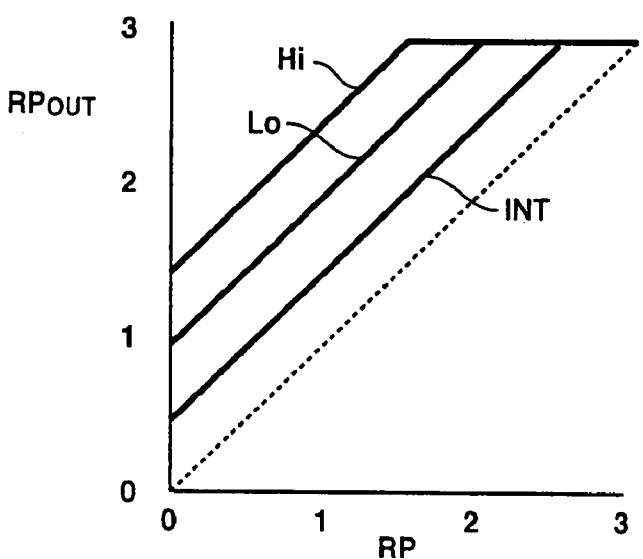
FIG. 10 illustrates a map used for a rainy weather modification of the risk perceived (RP)

One example of the rain modification is illustrated in FIG. 10. In FIG. 10, the horizontal axis represents the calculated or unmodified risk perceived RP. The vertical axis represents a modified risk perceived $RP_{out}$. When the wiper is in operation, the controller 50 relies on the relationship or map illustrated by the fully drawn lines in FIG. 10 using the calculated or unmodified risk perceived RP. In FIG. 9, the dotted line illustrates the relationship by which the calculated risk received RP is unmodified and used as the modified $RP_{out}$. Comparing the fully drawn lines to the dotted line clearly indicates that the modified risk perceived $RP_{out}$ increases when the wiper is in operation. If the setting position of the wiper shifts "intermittent", "low" and "high" in this order, the modified risk perceived $RP_{out}$ gets higher. After the rain modification, the logic proceeds to step S1510.

If, at step S1505, the wiper switch 37 is "OFF", the logic continues to step S1507. At step S1507, the controller 50 determines whether or not the power mode switch 33 is "ON". The controller 50 receives, as an input, the output signal of the power mode switch 33 by performing a reading operation to acquire, as one of the vehicle setting data, whether the power mode switch 33 is set "ON" or "OFF". If, at step S1507, the power mode switch 33 is set "ON" and the power mode is selected, the logic goes to step S1508. The state or setting position that the power mode is selected is considered to be one vehicle setting to be forwarded to the driver before forwarding the risk perceived RP to the driver. As the driver wishes to drive in a sporty manner, the driver may feel a reaction force from the accelerator pedal 80 in a different way. If, under this condition, a reaction force regulated in response to the regulated or unmodified risk perceived RP is provided to the driver, the driver may be refrained from performing an intended aggressive manipulation of the accelerator pedal 80.

Figure 11:
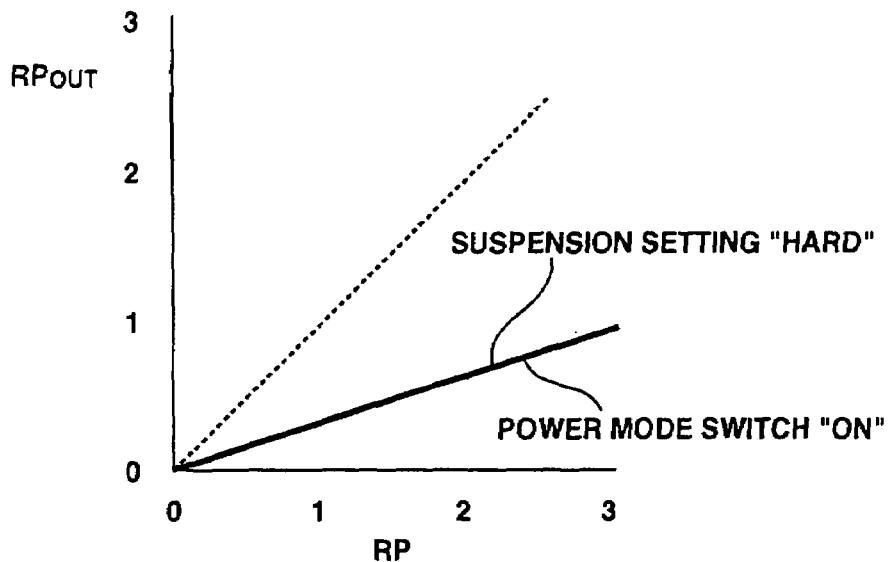
FIG. 11 illustrates a map used for a sporty mode modification of the risk perceived (RP)

Thus, at step S1508, the controller 50 modifies the risk perceived RP in response to the state or setting position that the power mode is selected. This modification is called a "sporty modification". One example of the sporty modification is illustrated in FIG. 11. In FIG. 11, the horizontal axis represents the calculated or unmodified risk perceived RP. The vertical axis represents a modified risk perceived $RP_{out}$. When the power mode switch 33 is "ON" to set the power mode, the controller 50 relies on the relationship or map illustrated by the fully drawn line in FIG. 11 using the calculated or unmodified risk perceived RP. In FIG. 11, the dotted line illustrates the relationship by which the calculated risk received RP is unmodified and used as the modified $RP_{out}$. Comparing the fully drawn line to the dotted line clearly indicates that a change in the modified risk perceived $RP_{out}$ to a change in the calculated or unmodified risk perceived RP is less when the power mode is selected and the maximum value of the modified risk perceived $RP_{out}$ is suppressed.

The setting is such that the modified risk perceived $RP_{out}$ is lower than the calculated or unmodified risk perceived RP over the whole region of the calculated or unmodified risk perceived RP and a change in the modified risk perceived $RP_{out}$ is smaller than that in the calculated or unmodified risk perceived RP. This setting provides a reaction force to the driver via the accelerator pedal 80, which is low enough to permit the driver to perform an intended aggressive manipulation of the accelerator pedal 80. After the sporty modification at step S1508, the logic proceeds to step S1510.

If, at step S1507, the power mode switch 33 is "OFF", the logic continues to step S1509. At step S1509, the controller 50 determines whether or not the suspension setting switch 34 is set to "HARD". The controller 50 receives, as an input, the output signal of the suspension setting switch 34 by performing a reading operation to acquire, as one of the vehicle setting data, whether the suspension is set to hard setting. If, at step S1509, the suspension is set to the hard setting, the logic goes to step S1508. The state or setting position that the hard setting is selected is considered to be one vehicle setting to be forwarded to the driver before forwarding the risk perceived RP to the driver. As the driver wishes to drive in sporty manner when the hard setting is selected in the suspension, the driver may feel a reaction force from the accelerator pedal 80 in a different way. If, under this condition, a reaction force regulated in response to the regulated or unmodified risk perceived RP is provided to the driver, the driver may be refrained from performing an intended aggressive manipulation of the accelerator pedal 80.

Thus, the logic proceeds to step S1508 in the same manner as the power mode was selected. At step S1508, the controller 50 performs the sporty modification of the risk perceived RP. As the fully drawn line in FIG. 11 indicates, a change in the modified risk perceived $RP_{out}$ to a change in the calculated or unmodified risk perceived RP is less when the hard setting is selected in the suspension system, and the maximum value of the modified risk perceived $RP_{out}$ is suppressed. The setting is such that the modified risk perceived $RP_{out}$ is lower than the calculated or unmodified risk perceived RP over the whole region of the calculated or unmodified risk perceived RP and a change in the modified risk perceived $RP_{out}$ is smaller than that in the calculated or unmodified risk perceived RP. This setting provides a reaction force to the driver via the accelerator pedal 80, which is low enough to permit the driver to perform an intended aggressive manipulation of the accelerator pedal 80. After the sporty modification at step S1508, the logic proceeds to step S1510.

If, at step S1509, the hard setting is not selected in the suspension system, the logic continues to step S1510. At step S1510, the controller 50 receives, as inputs, the output signals from the seat position sensor 35 and steering position sensor 36 by performing a reading operation to acquire, as one of the vehicle setting data, a seat position (longitudinal position of the driver's seat), a tilt position of the steering 90, and a telescoped or retracted position of the steering wheel 90. At step S1510, the controller 50 modifies the calculated or unmodified risk perceived RP in response to the seat position, tilted position, and telescoped or retracted position. If the calculated or unmodified risk potential RP has been modified at step S1502 or S1504 or S1506 or S1508, the controller 50 further modifies the modified risk perceived $RP_{out}$ at step S1510.

Naturally, the seat position of the driver's seat and/or tilted and telescoped (retracted) positions of the steering wheel 90 may vary with different physiques of drivers. With the same reaction force from the accelerator pedal 80, a driver with small physique and another driver with a large physique will feel the reaction force in different ways. Thus, at step S1510, the controller 50 performs a "physique modification" of the unmodified risk perceived RP or the modified risk perceived $RP_{out}$.

Figure 12:
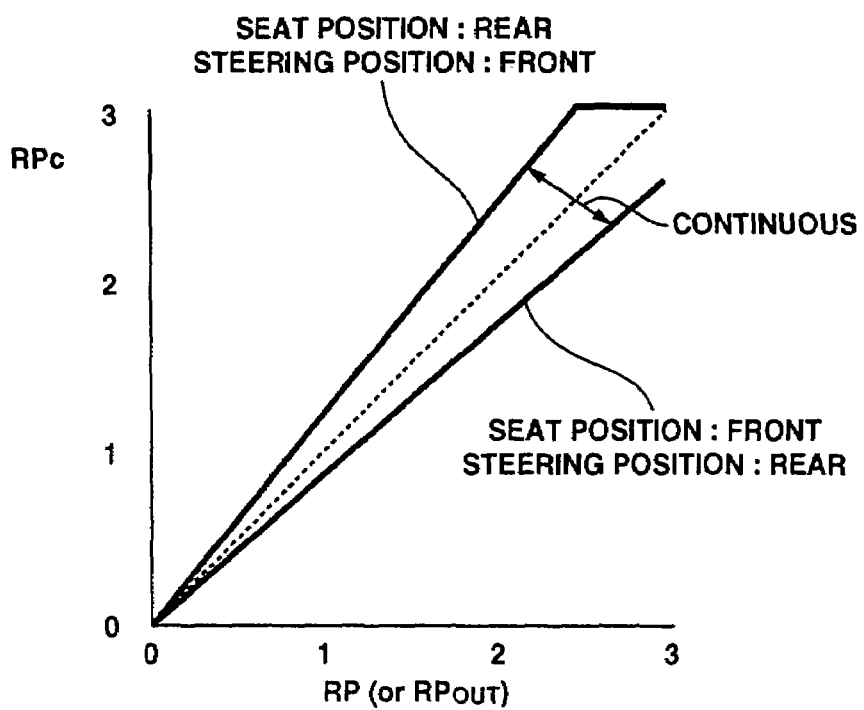
FIG. 12 illustrates a map used for a physique modification of the risk perceived (RP)

One example of the physique modification is illustrated in FIG. 12. In FIG. 12, the horizontal axis represents the unmodified risk perceived RP or the modified risk $RP_{out}$. The vertical axis represents a physique-modified risk perceived $RP_c$.

As shown in FIG. 12, with the same increase in the unmodified risk perceived RP or modified risk perceived $RP_{out}$, the physique-modified risk perceived $RP_c$ increases less when the seat position is front and the steering position is rear indicating that a driver is seated near the accelerator pedal 90 than it does when the seat position is rear and the steering position is front indicating that a driver is seated remote from the accelerator pedal 90. The physique-modified risk perceived $RP_c$ gets larger as the driver becomes more remote from the accelerator pedal 80.

At step S1510, the controller 50 may modify the unmodified risk perceived RP or modified risk perceived $RP_{out}$ with the seat position, and then with the steering position. If desired, the controller 50 may modify the unmodified risk perceived RP or the modified risk perceived $RP_{out}$ with the steering position, and then with the seat position.

In the exemplary implementation, the controller 50 always performs the above-mentioned physique modification and gives top priority to this modification. In other words, this physique modification is always carried out irrespective of the presence or absence of the PKB modification, snow mode modification, rain modification, and sporty modification.

In the exemplary implementation, the physique modification is followed by the PKB modification, snow mode modification, rain modification, and sporty modification in this order of priority. As the unmodified risk perceived RP is modified by the modification of higher priority, information with higher priority may be forwarded to the driver via the accelerator pedal 80.

Figure 13:
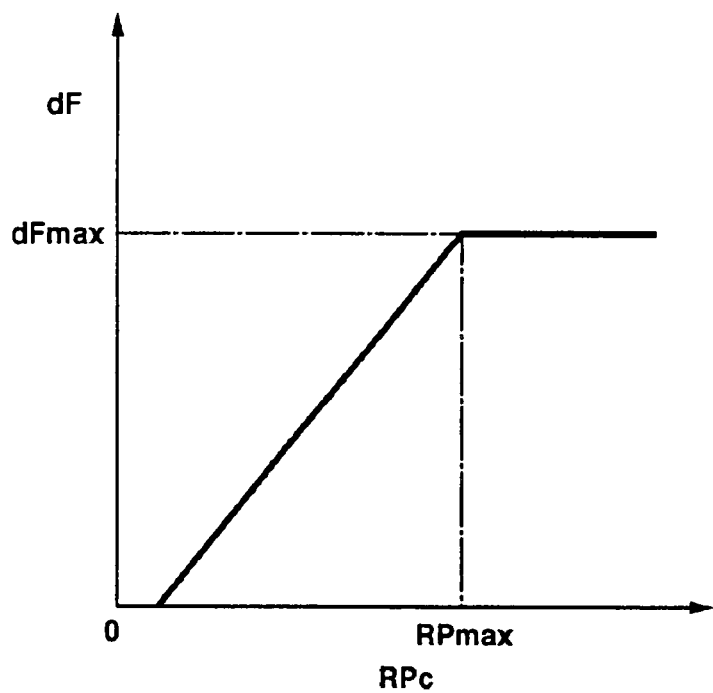
FIG. 13 illustrates varying of an increment (dF) in reaction force (F) with different values of the modified risk perceived $(RP_c)$.

Turning back to FIG. 5, after completion of modifications at step S150, the logic goes to step S160. At step S160, the controller 50 calculates an increment dF in reaction force based on the physique-modified risk perceived $RP_c$. The fully drawn line in FIG. 13 illustrates one example of the relationship between the increment dF and the physique-modified risk perceived $RP_c$. As shown in FIG. 13, the increment dF is proportional to physique-modified risk perceived $RP_c$ unless the physique-modified $RP_c$ exceeds a maximum value $RP_{max}$. If the physique-modified $RP_c$ exceeds the maximum value $RP_{max}$, the increment dF is kept fixed to the maximum value $dF_{max}$.

The increment dF is prevented from increasing further and is fixed to the maximum value $dF_{max}$ if the physique-modified $RP_c$ exceeds the maximum value $RP_{max}$, thus permitting the driver to depress intentionally to pass the preceding vehicle.

At the next step S170, the controller 50 provides, as an output, the increment dF to the accelerator pedal reaction force control unit 60. The accelerator pedal reaction force control unit 60 regulates the servo motor 70 so that the increment dF (positive or negative) in reaction force is added to the ordinary reaction force characteristic Fi as shown in FIG. 14. A reaction force resulting from this addition of the increment dF to the ordinary reaction force characteristic Fi is provided to the driver via the accelerator pedal 80.

The exemplary implementation of the present invention has effects as follows:

(1) The controller 50 calculates a risk perceived RP based on a state of a vehicle and an environment around the vehicle, and modifies the calculated risk perceived RP based on vehicle setting state or states. If, for example, the vehicle setting state indicates how a shift pattern of an automatic transmission is set in mode, modifying the risk perceived RP with the vehicle setting state makes it possible to carry out an appropriate reaction force regulation in a manner that reflects the tendency of a vehicle driver to perceive varying levels of risk with different states of the vehicle or the vehicle driver because the vehicle setting state represents the state of the vehicle or the vehicle driver.

(2) The controller 50 detects, as a vehicle setting state, how a parking brake is set. A state of the parking brake is regarded as a piece of information to be forwarded to the vehicle driver before the calculated risk perceived RP. Modifying the risk perceived RP with this vehicle setting state makes it possible to carry out an appropriate reaction force regulation by forwarding the information on the parking brake to the vehicle driver in the form of reaction force from an accelerator pedal.

(3) The controller 50 detects, as a vehicle setting state, whether or not an automatic transmission is set in a snow mode shift pattern. During selection of the snow mode shift pattern as detected by a snow mode switch 32 turning "ON", the vehicle driver feels the same reaction force from an accelerator pedal in a different way due to the vehicle state, such as, running on a slippery snowy road. If, under this condition, a reaction force from the accelerator pedal were regulated on a risk perceived RP from a preceding vehicle only, a vehicle driver would be prevented from carrying out a fine management of the accelerator pedal needed to maneuver the vehicle on a slippery road. However, modifying the risk perceived RP with the vehicle setting state whether or not the automatic transmission is set in the snow mode shift pattern makes it possible to carry out an appropriate reaction force regulation by permitting the vehicle driver to carry out the fine management of the accelerator pedal on a slippery road.

(4) The controller 50 detects, as a vehicle setting state, whether or not an automatic transmission is set in a power mode shift pattern. During selection of the power mode shift pattern as detected by a power mode switch 33 turning "ON", the vehicle driver feels the same reaction force from an accelerator pedal in a different way due to the vehicle driver's condition that the driver wishes a sporty driving. If, under this condition, a reaction force from the accelerator pedal were regulated on a risk perceived RP from a preceding vehicle only, a vehicle driver would be prevented from carrying out an intentional stepping on the accelerator pedal needed to maneuver the vehicle in sporty driving. However, modifying the risk perceived RP with the vehicle setting state whether or not the automatic transmission is set in the power mode shift pattern makes it possible to carry out an appropriate reaction force regulation, by permitting the vehicle driver to carry out the intentional stepping on the accelerator pedal to accomplish what the driver wishes in sporty driving.

(5) The controller 50 detects, as a vehicle setting state, whether or not a suspension system is set in a hard setting. During selection of the hard setting by manipulating a suspension setting switch 34, the vehicle driver feels the same reaction force from an accelerator pedal in a different way due to the vehicle driver's condition that the driver wishes a sporty driving by selecting the hard setting for the suspension system. If, under this condition, a reaction force from an accelerator pedal were regulated on a risk perceived RP from a preceding vehicle only, a vehicle driver would be prevented from carrying out an intentional stepping on the accelerator pedal needed to maneuver the vehicle in sporty driving. However, modifying the risk perceived RP with the vehicle setting state whether or not the suspension system is set in the hard setting makes it possible to carry out an appropriate reaction force regulation by permitting the vehicle driver to conduct the intended stepping on the accelerator pedal to accomplish what the driver wishes in the sporty driving.

(6) The controller 50 detects, as a vehicle setting state, a seat position, i.e., a longitudinal position that a driver's seat is adjusted to. Vehicle drivers with different sizes in physique feel the same reaction force from an accelerator pedal in varying ways if the seat position differs. Modifying the risk perceived RP with the detected seat position makes it possible to conduct an appropriate reaction force regulation in a manner that alters the magnitude of reaction force to cause the vehicle drivers to perceive the same risk in substantially the same way.

(7) The controller 50 detects, as a vehicle setting state, how a steering wheel is set in tilted and/or in telescoped (or retracted) positions. Vehicle drivers with different sizes in physique feel the same reaction force from an accelerator pedal in varying ways if the tilted and/or telescoped positions of the steering wheel differ. Modifying the risk perceived RP with the detected tilted and/or telescoped positions of the steering wheel makes it possible to conduct an appropriate reaction force regulation in a manner that alters the magnitude of reaction force to cause the vehicle drivers to perceive the same risk in substantially the same way.

(8) The controller 50 detects, as a vehicle setting state, how a windshield wiper is set in ON/OFF position and in speed. The vehicle driver feels the same risk in varying ways with different degrees in front view if the ON/OFF position and/or speed of the windshield wiper differ. Modifying the risk perceived RP with the detected setting of the windshield wiper makes it possible to conduct an appropriate reaction force regulation in a manner that alters the magnitude of reaction force to cause the vehicle driver to perceive the same risk in the varying ways with different degree in front view.

(9) The controller 50 detects a plurality of vehicle setting states and modifies a risk perceived RP based on one of the detected plurality of vehicle setting states selected according to a predetermined order of priority. Thus, the controller 50 can forward the most important information to a vehicle driver even if the controller 50 has detected a plurality of different factors covering a driver's feeling the same risk in varying ways and a driver's feeling the same reaction force from an accelerator pedal in varying ways.

(10) The predetermined order of priority for the plurality of vehicle setting states is as follows:

1. Vehicle setting states how a driver's seat is set in position (seat position) and how a steering wheel 90 is set in tilted and telescoped positions;
2. A vehicle setting state how a parking brake is set;
3. A vehicle setting state whether or not an automatic transmission is in snow mode-shift pattern;
4. A vehicle setting state how a windshield wiper is set;
5. Vehicle setting states whether or not the automatic transmission is in power mode shift pattern and how a suspension system is set.

Modifying a risk perceived RP based on one of the detected plurality of vehicle setting states selected according to a predetermined order of priority makes it possible to reflect pieces of information from the most important state for a vehicle driver in carrying out reaction force regulation.

(11) The controller 50 recognizes different sizes of vehicle drivers in physique from the seat position, and the steering wheel tilted and telescoped positions, and modifies a risk perceived RP in response to the different sizes in physique. The drivers may feel the same reaction force even if they tend to feel the reaction force in various ways with different sizes in physique.

In described exemplary implementation, a number of signals from the parking brake switch 31, snow mode switch 32, power mode switch 33, suspension setting switch 34, seat position sensor 35, steering position sensor 36, and wiper switch 37 are provided, as inputs, to the controller 50 for detecting a plurality of vehicle setting positions. This is just one example. Another example is to detect a single vehicle setting state and modify a risk perceived RP based on the detected single vehicle setting state. In the exemplary implementation, the power mode switch 33 is used in detecting whether or not an automatic transmission is set in power mode shift pattern. In addition, the controller 50 may detect whether or not the automatic transmission is set in manual mode shift pattern. Instead of detecting whether or not the automatic transmission is in the power mode shift pattern, the controller 50 may detect whether or not the automatic transmission is in manual mode shift pattern, only. Similarly to the case when the power mode shift pattern is selected, the controller 50 carries out the sporty modification as described in connection with FIG. 11 in response to detection that the automatic transmission is in manual mode shift pattern.

In the exemplary implementation, the controller 50 detects the physique of a vehicle driver using the seat position sensor 35 and steering position sensor 36 for detection of the seat position and the steering wheel position. The present invention is not limited to this example. Using only one of these sensors, the controller 50 may detect the physique of a vehicle driver. In the exemplary implementation, both tilted and telescoped positions are detected to give the steering wheel position. However, only one of the tilted and telescoped positions may be sufficient in giving the steering wheel position.

In the exemplary implementation, the relationship or map illustrated in FIG. 9 is used in snow mode modification. The map that may be used in snow mode modification is not limited to the one example illustrated in FIG. 9, as long as relatively high values are given as modified risk perceived $RP_{out}$ and these values fall in a narrow range so that the modified risk perceived $RP_{out}$ varies at a gradual rate against a unit change in risk perceived RP. The relationships or maps illustrated in FIGS. 10-12 are just examples used in rain modification, sporty modification, and physique modification. The present invention is not limited to the maps illustrated in FIGS. 10-12.

In the exemplary implementation, the relationship as illustrated in FIG. 13 between a risk perceived RP and a reaction force increment dF is used to vary the reaction force increment dF with different values of risk perceived RP in a proportional manner. The present invention is not limited to this relationship. The reaction force increment dF may be varied with different values of risk perceived RP in exponential manner.

In the exemplary implementation, the laser radar 10 and vehicle speed sensor 30 are used to recognize environment around a vehicle. The parking brake switch 31, snow mode switch 32, power mode switch 33, suspension setting switch 34, seat position sensor 35, steering position sensor 36, and wiper switch 37 are used to detect vehicle setting states. The controller 50 is used to calculate a risk perceived RP and modify the risk perceived RP. The controller 50 and the accelerator pedal reaction force control unit 60 are used to regulate reaction force to manual effort of a vehicle driver to a driver controlled input device. The hardware is not limited to the example. For example, instead of the laser radar 11, a different type of millimeter radar and/or a CCD camera and/or a CMOS camera may be used to recognize environment around the vehicle. A brake pedal reaction force control unit may be used to regulate reaction force to manual effort of a vehicle driver to a driver controlled input device.

Although the invention has been shown and described with respect to the exemplary implementation, it is obvious that equivalent alterations and modifications will occur to others skilled in the art upon reading and understanding of the specification. The present invention includes all such equivalent alterations and modifications, and is limited only by the scope of the claims.

The present application claims the priority based on Japanese Patent

Application No. 2003-391123, filed Nov. 20, 2003, the disclosure of which is hereby incorporated by reference in its entirety.

What is claimed is:

1. A driver assisting system for a vehicle having a driver controlled input device operable by a driver and through which force may be applied to the driver, comprising:
   means for acquiring data including information on environment in a field around the vehicle and information on vehicle setting regarding how devices are set within the vehicle;
   means for calculating risk from the environment using the acquired data and the vehicle setting;
   means for determining, accounting for the calculated risk, a change in force applied to the driver via the driver controlled input device; and
   means for determining a force modification and modifying the change in force at the driver controlled input device according to the determined force modification, to convey information related to the calculated risk to the driver.

2. The driver assisting system as recited in claim 1, further comprising means for determining a driver physique based on a vehicle setting, the means for determining a force modification basing the force modification on the determined driver physique.

3. The driver assisting system as recited in claim 1, wherein the means for determining a force modification bases the force modification on at least one vehicle setting.

4. The driver assisting system as recited in claim 3, wherein a plurality of vehicle settings are prioritized into a vehicle setting priority, and the means for forming the force modification modifies change in force in accordance with the vehicle setting priority.

5. A method for assisting a driver operating a driver controlled input device within a vehicle, force being applicable to the driver through the driver controlled input device, the method comprising the steps:
- acquiring data including information on environment in a field around the vehicle and information on vehicle setting regarding how devices are set within the vehicle;
- calculating risk from the environment using the acquired data and the vehicle setting;
- determining, accounting for the calculated risk, a change in force applied to the driver via the driver controlled input device; and
- determining a force modification and modifying the change in force at the driver controlled input device according to the determined force modification to convey information related to the calculated risk to the driver.

6. The method as recited in claim 5, wherein the step of determining a force modification includes determining a driver physique based on the vehicle setting.

7. The method as recited in claim 5, further comprising prioritizing a plurality of vehicle settings into a vehicle setting priority, and wherein the step of determining a force modification is performed in accordance with the vehicle setting priority.

8. A computer program product for controlling a driving assist system having
- a driver controlled input device within a vehicle, force being applicable to the driver through the driver controlled input device, the computer program product causing a controller of the driving assist system to perform the steps of:
- acquiring data including information on environment in a field around the vehicle and information on vehicle setting regarding how devices are set within the vehicle;
- calculating risk from the environment using the acquired data and the vehicle setting;
- determining, accounting for the calculated risk, a change in force applied to the driver via the driver controlled input device; and
- determining a force modification and modifying the change in force at the driver controlled input device according to the determined force modification, to convey information related to the calculated risk to the driver.

9. The computer program product as recited in claim 8, wherein the step of determining a force modification includes determining a driver physique based on the vehicle setting.

10. The computer program product as recited in claim 8, further comprising causing the controller to prioritize a plurality of vehicle settings into a vehicle setting priority, and wherein the step of determining a force modification is performed in accordance with the vehicle setting priority.

\* \* \* \* \*